(12) United States Patent
Schmidt-Schäffer et al.

(10) Patent No.: US 9,513,622 B2
(45) Date of Patent: Dec. 6, 2016

(54) METHOD FOR CONFIGURATION AND/OR EQUIPMENT OF A VEHICLE CABIN, IN PARTICULAR OF AN AIRCRAFT

(76) Inventors: Tobias Schmidt-Schäffer, München (DE); Benjamin Becker, München (DE); Ulrich Seifert, Hamburg (DE)

( * ) Notice: Subject to any disclaimer, the term of this patent is extended or adjusted under 35 U.S.C. 154(b) by 955 days.

(21) Appl. No.: 13/641,269

(22) PCT Filed: Apr. 14, 2011

(86) PCT No.: PCT/DE2011/000413
§ 371 (c)(1),
(2), (4) Date: Oct. 15, 2012

(87) PCT Pub. No.: WO2011/127910
PCT Pub. Date: Oct. 20, 2011

(65) Prior Publication Data
US 2013/0066602 A1    Mar. 14, 2013

(30) Foreign Application Priority Data

Apr. 14, 2010  (DE) .................. 10 2010 014 899
May 26, 2010  (DE) .................. 10 2010 021 638

(51) Int. Cl.
*G06G 7/48*      (2006.01)
*G05B 19/4093*   (2006.01)
(Continued)

(52) U.S. Cl.
CPC ........... *G05B 19/40931* (2013.01); *B64F 5/00* (2013.01); *G05B 17/02* (2013.01);
(Continued)

(58) Field of Classification Search
CPC .............. G06F 17/50; G06F 17/5004; G06F 17/5009; G06F 17/5086; G06F 17/5095; G06F 17/5081
USPC ...................................................... 703/1, 8
See application file for complete search history.

(56) References Cited

U.S. PATENT DOCUMENTS 6,968,298 B2 * 11/2005 Lohmann et al. ............... 703/1
8,214,069 B2 *  7/2012 Yucel et al. .................. 700/97
(Continued)

FOREIGN PATENT DOCUMENTS

| DE | 100 41 031 A1 | 3/2002 |
|---|---|---|
| DE | 100 46 742 A1 | 4/2002 |
| DE | 10 2009 040731 A1 | 3/2011 |
| DE | 10 2009 043327 A1 | 3/2011 |

OTHER PUBLICATIONS

International Search Report mailed Sep. 29, 2011 (PCT/DE2011/000413); ISA/EE.

Primary Examiner — David Silver
(74) Attorney, Agent, or Firm — Banner & Witcoff, Ltd.

(57) ABSTRACT

The invention relates to a method for the automatic configuration and/or equipment of a vehicle cabin (1), more particularly of an aircraft, wherein the cabin (1) is subdivided into a plurality of zones (A, B, C, D, E) and the method furthermore comprises the following steps: —selection of a plurality of individual modules (11*a*, 11*b*, 11*c*) from a pool of individual modules, —automatic connection of the selected individual modules (11*a*, 11*b*, 11*c*) to form a desired module package (10*a*), —automatic calculation of a desired module package configuration value, —automatic comparison of the desired module package configuration value with predefined module package configuration values which respectively correspond to a technically prevalidated module package, —automatic selection of the module package (10*b*) whose module package configuration value deviates the least from the desired module package configuration value, —arrangement of the selected module package (10*b*) in a zone (A, B, C, D, E) of the cabin (1). The invention furthermore relates to a system and a computer program.

19 Claims, 8 Drawing Sheets

Figure 1:
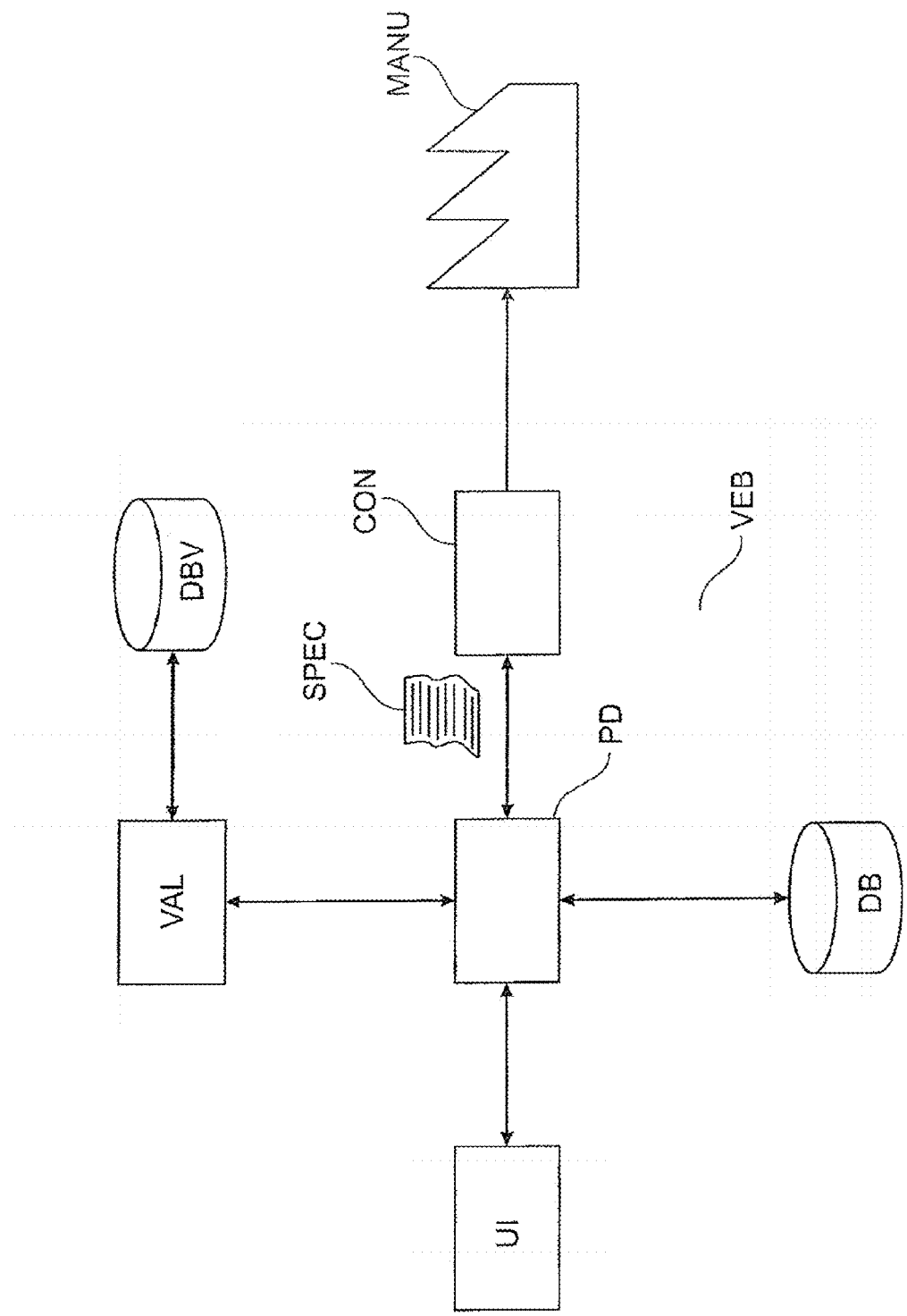

(51) Int. Cl.
*G06F 17/50* (2006.01)
*B64F 5/00* (2006.01)
*G05B 17/02* (2006.01)

(52) U.S. Cl.
CPC .......... *G06F 17/50* (2013.01); *G06F 17/5095* (2013.01); *G05B 2219/35152* (2013.01); *G05B 2219/35155* (2013.01); *G06F 2217/46* (2013.01); *Y02P 90/265* (2015.11)

(56) References Cited

U.S. PATENT DOCUMENTS

| | | |
|---|---|---|
| 2002/0026296 A1 | 2/2002 | Lohmann et al. |
| 2004/0153295 A1 | 8/2004 | Lohmann et al. |
| 2005/0209830 A1 | 9/2005 | Lee et al. |
| 2007/0038422 A1* | 2/2007 | Wang et al. ............... 703/8 |
| 2007/0198230 A1* | 8/2007 | Wang et al. ............... 703/1 |
| 2009/0112349 A1* | 4/2009 | Cobb et al. ............... 700/114 |

* cited by examiner

METHOD FOR CONFIGURATION AND/OR EQUIPMENT OF A VEHICLE CABIN, IN PARTICULAR OF AN AIRCRAFT

CROSS-REFERENCE TO RELATED APPLICATIONS/PRIORITY CLAIM

The present application is a U.S. National Phase filing of International Application No. PCT/DE2011/000413, filed on Apr. 14, 2011, designating the United States of America and claiming priority to German Patent Application No. 10 2010 014 899.7 filed Apr. 14, 2010, and German Patent Application No. 10 2010 021 638.0 filed May 26, 2010. The present application claims priority to and the benefit of all the above-identified applications, which are all incorporated by reference herein in their entireties.

The invention relates to a method for automatic configuration and/or equipment of a vehicle cabin, in particular of an aircraft.

BACKGROUND OF THE INVENTION

In vehicles for transporting passengers there is a need to equip these with appropriate fittings.

A passenger airplane for example consists of a large number of components. Many of these components may be and are ordered by the respective airlines in a certain specification, modification or configuration, i.e. they are produced according to customer requirements. There is a standard airplane that is appropriately developed and approved. Aircraft ordered by a customer are always developed and approved with regard to the standard airplane. This occurs by tracking the amendments (modifications) to the standard airplane in order to represent the corresponding customer configuration.

Each airline has, in addition to certain wishes with regard to the interior fittings of the aircraft, requirements that are prescribed by the particular national aviation authorities. Above all, however, technical requirements with regard to flight mechanics, structural mechanics and vibration mechanics and connection requirements with regard to ventilation, hydraulics, electrics, etc. must be taken into account.

The provision of the respective differently configured components for final installation takes place within the context of so-called "realization engineering". In this case the different configurations or specifications that are required by the airline are recorded.

On the basis of this recorded specification material, construction documents are then prepared, such as for example construction plans, parts lists and other documentation necessary for equipping a cabin of an aircraft. Due to the immense range of possible combinations this pre-engineering step is time-consuming and expensive. Thus there is a need in the aircraft industry for development to be configured more efficiently by targeted module-orientated pre-engineering and, based thereon, production of suitable assemblies for the airplane.

Furthermore, for example, an airplane cabin usually has connections, the position of these connections being fixed for example on the basis of safety rules. It is therefore necessary for the components with which the aircraft cabin is to be equipped to be disposed in the aircraft cabin in such a way that the connections of the aircraft cabin can be connected to the corresponding connections on the components.

Furthermore it is necessary for space in an airplane cabin to be utilized efficiently, so that the greatest possible number of passengers can be transported, thereby in particular reducing the fuel consumption per passenger.

For this purpose proposed solutions are already known in the prior art. Thus DE 100 41 031 A1 discloses a method for configuration of component arrangements, i.e. for definition of the spatial arrangement of components relative to one another and for optimization thereof with regard to position and/or amount, preferably in an airplane. In order to configure the arrangement of the components automatically and in order, if appropriate, to create production documents automatically by means of a data processing program, it is provided that the airplane type on which the construction documents are based is input into a configuration tool of a data processing system, that the airplane-specific geometry is stored in a drawing module of the data processing system stored and is automatically loaded therefore and displayed, that in a functional and data analysis the necessary geometric objects or components are determined and described mathematically, position rules are mapped mathematically and stored and added to the airplane-specific geometry in the drawing module of the data processing system, and that in the configuration tool of the data processing system the objects or components together with the airplane-specific geometry are automatically optimally configured spatially relative to one another according to a defined set of rules taking account of the customer requirements. However, a disadvantage of this is that a calculation with regard to the configuration of the components in the airplane cabin must be performed for the entire airplane cabin, which makes the calculation time-consuming and requires considerable computing power.

BRIEF SUMMARY OF THE INVENTION

The object of the invention may therefore be regarded as providing a method that overcomes the existing disadvantages and satisfies the above-mentioned requirements. In particular the method should make it possible for configuration and/or equipment of a cabin of an aircraft to be carried out efficiently and quickly, with regard to both the production and the approval or acceptance.

The object is achieved by a method according to claim 1, by a computer program according to claim 7 and by a system according to claim 8. Advantageous embodiments of the invention are the subject matter of dependent subordinate claims.

The invention embodies the idea of providing a method for automatic configuration and/or equipment of a vehicle cabin, in particular of an aircraft, wherein the cabin is subdivided into a plurality of zones and furthermore the method comprises the following steps:

selection of one or more individual modules from a pool of individual modules, automatic joining of the selected individual modules to form a desired module package, automatic calculation of a desired module package configuration value, automatic comparison of the desired module package configuration value with predefined module package configuration values, which each correspond to a technical pre-validated module package, automatic selection of the module package, of which the module package configuration value deviates least from the desired module package configuration value, arrangement of the selected module package in a zone of the cabin.

Furthermore the invention embodies the idea of providing a system for configuration and equipment of a vehicle cabin, in particular of an aircraft, arranged to carry out the method according to the invention, comprising:
- an input device for capturing a user input,
- a configuration device connected to the input device, wherein the configuration device has a processor and a memory device for storing the data of the pool of individual modules,
- a display unit for displaying the desired module package and the selected module package, and
- a control unit for coordinating the final installation in the plant.

According to the invention a vehicle may be a ship, a bus, a train or an aircraft, such as for example an airplane, an airship, a helicopter, etc. By way of example reference is made below to a passenger airplane.

According to the invention the cabin is subdivided into a plurality of zones, wherein the different zone types "parameter zone" and "dynamic zone" may be provided. In this case a parameter zone may for example be an entry zone, i.e. an area that is subject to the predefined limitations predetermined by particular boundary conditions, in this case a door and predetermined paths for walking or moving about. Furthermore a dynamic zone may be defined as a passenger zone, i.e. a zone in which for example rows of passenger seats are arranged dynamically, wherein a limitation may be provided by a start or end parameter predefined by a parameter zone. For example the cabin is subdivided into a parameter zone and a dynamic zone. In particular, however, the cabin may also be subdivided into a plurality of parameter zones and/or a plurality of dynamic zones.

According to the invention an individual module is selected from a pool of individual modules, wherein a plurality of individual modules can also be selected from the pool. These may be understood for example as virtual data of individual modules that are stored on a database system. The selected individual modules are then joined to form a desired module package. In other words a user here determines his desired configuration relative to the cabin layout, in particular a certain required arrangement of the individual modules or, in the case of only one selected individual module, of the individual module in the cabin can be predetermined. In this case the user does not have to think about provisions or requirements that are relevant to safety. Such an arrangement of individual modules may also be designated as a desired module package configuration.

Then a desired module package configuration value is calculated based upon the desired module package configuration. For example the desired module package configuration value takes into account the precise arrangement of the individual modules in the cabin and/or the relative position of the individual modules relative to one another. The type and/or the number of individual modules is also preferably taken into account. It may also be provided that module packages already arranged in the cabin are taken into account in the calculation of the desired module package configuration value. For example the desired module package configuration value may take an individual module parameter into consideration. Such an individual module parameter may for example comprise a position of a connection or a connection position. In particular the connection is a hydraulic, electrical and/or mechanical connection.

In a next step the calculated desired module package configuration value is compared with supplied module package configuration values, wherein these correspond in each case to a module package. These module package configuration values take into consideration in particular the same parameters as the desired module package configuration value, albeit based on the particular module package. The comparison may in particular be carried out by in each case forming a difference between the desired module package configuration value and the module package configuration values. The module package configuration values can preferably also be weighted with a weighting parameter. The module packages may also be designated as supplied module packages. The supplied module packages or the supplied module package configuration values are preferably calculated by means of an algorithm, wherein the algorithm takes into account the technical boundary conditions, such as permissible weight, center of gravity, mechanical, electrical and hydraulic connections, etc. In other words, only arrangements that are found to be technically permissible by the algorithm are possible. For example in this case minimum areas and paths for moving and walking about are taken into account.

The module package is then selected from the supplied module packages, and has a module package configuration value that deviates least from the desired module package configuration value. For example the minimum of the absolute values of the differences formed as above can be selected as selection criterion.

In a next step the selected module package is then arranged in the cabin.

In a particularly preferred embodiment of the invention the cabin is subdivided into a plurality of zones and the selected module package is arranged in one of the plurality of zones. Furthermore it may for example be provided that in the subdivision of the cabin into a plurality of zones at least one parameter zone and one dynamic zone are provided. In particular, however, the cabin may also be subdivided into a plurality of parameter zones and/or a plurality of dynamic zones. The selected module package is preferably arranged in the parameter zone for complete configuration of the parameter zone. In other words a subsequent change to the configuration of the parameter zone is not provided. In this case in particular the size and the boundaries of the parameter zone are defined, i.e. for example it is defined here whether the boundary of the parameter zone is formed by open areas or by a rigid partition. It may then be provided in particular that one or more individual components is/are selected from a pool of individual components. Then an individual component configuration of the dynamic zone is preferably calculated in accordance with the arrangement of the selected module package in the parameter zone. In other words the arrangement of the module packages in the parameter zone determines the individual component configuration. For example, a minimum distance between an individual module of the module package and an individual component can be taken into account in this calculation. In the configuration of the dynamic zone a further algorithm takes into account not only the parameters of the parameter zone but also the technical boundary conditions such as the center of gravity, connection situation, paths for walking or moving about, etc. In particular the individual components are arranged in the dynamic zone in accordance with the calculated individual component configuration. In this case the algorithm only allows permissible arrangements, i.e. in particular no arrangements are accepted that contravene the technical requirements, e.g. requirements relating to flight or structural mechanics. The selection of the individual components again involves a pool of different individual components.

The equipping process itself, i.e. the production or assembly of the individual modules and the module packages then takes place based on the automated configuration. In this case the production may for example include the subdivision of the zones by means of corresponding markers. The selection may then take place for example from a warehouse with corresponding individual modules, module packages or modules or components. The arrangement then takes place physically on the basis of the calculations, i.e. the module packages and individual components are arranged and fitted in the airplane cabin.

A parameter zone may be occupied by one single individual module or a module package consisting of a plurality of individual modules, for example a galley module or a toilet module, wherein the positioning and system connections thereof are also correspondingly defined. As a result the complexity is reduces by comparison with the prior art. These modules define in particular a series of parameters for the dynamic zones bordering the parameter zone, in particular with regard to their start and end position and the connections for systems, such as for example cable harnesses, etc. Furthermore the parameter zones of the doors define all systems that are necessary for maintenance thereof. These systems are for example waste water, fresh water, air conditioning, etc. and also extend accordingly through the dynamic zones. The configuration of the modules or the module packages that are contained in such a parameter zone is limited by the modules and the zone. So a galley module should not exceed a certain weight and an appropriate power consumption. The main complexity and variability of the cabin should be mapped and limited in a modular manner.

A dynamic zone is configured in accordance with several customer parameters as well as the parameters of the parameter zone. The elements contained therein are for example rows of seats, wall claddings and the wiring therefor, e.g. for seat-to-seat and further wiring such as the wiring for the personal service units in the ceiling etc. This wiring and positioning of the elements in the zones uses the boundary conditions from the parameter zones and thus can easily provide a basis for the construction documents for inter alia cable harnesses, the rows of seats, the PSUs (personal service units) etc.

In this case the subdivision of the cabin into parameter zones and dynamic zones offers in particular the advantage of a configuration and/or equipment that saves time and requires less computing power, as the equipment and/or the configuration does not have to be calculated for the entire cabin, but only for a predetermined zone: the dynamic zone. Because the parameter zone is configured and/or equipped with module packages, in particular with preconfigured module packages, the expenditure on computing or the expenditure of time of a given computer system is reduced, or the necessary size and power of the computer system and thus the costs thereof can be minimized.

Advantages of this system are, inter alia:
1. The certification of the airplane is simple to ensure since the door regions are defined by specifications for emergency evacuation, cabin staff per exit, aisle widths in the door region etc. and the parameters of the dynamic zone are defined by specifications such as: seats only at an appropriate distance from structures, for example a galley module or toilet module, in the door, seats only at positions that are visible from the crew seat, seats with a minimum spacing/inclination of the seat back, etc.
2. Simple assembly. The door regions are relatively limited and static and so can be installed in a definable time frame. Possible mountings, system connections etc. have fewer variants. Fewer variants of the standard airplane are produced. The seat areas have fixed interfaces for the wiring and the structure.

According to a preferred embodiment of the invention, the at least one individual module parameter comprises a connection position of a hydraulic, electrical and/or mechanical connection. Thus it is possible in an advantageous manner that individual modules or the module packages are arranged in the cabin in such a way that connections arranged in the cabin can be connected to corresponding counterpart connections arranged on the individual modules or module packages. The at least one individual module parameter may preferably comprise a center of gravity and/or an aerodynamic center of gravity. Thus in an advantageous manner the individual modules or the module packages can be arranged in the cabin in such a way that an optimal secure and aerodynamic weight distribution is achieved. In particular such an optimal weight distribution enables a secure flight attitude of an aircraft.

According to a particularly preferred embodiment of the invention the individual module list or the pool comprises a passenger seat row module, a galley module, a toilet module, a crew seat module, an emergency equipment module, in particular an oxygen supply module, a multimedia module, a staircase module and/or a cabin interior cladding module. For example the cabin interior cladding module comprises at least one luggage compartment. Thus a user may for example define a parameter zone by selecting a galley module, a staircase module and a toilet module and joining them to form a desired module package, i.e. his desired configuration. However, such a desired configuration may lie outside technical specifications. Therefore first of all the desired module package configuration value is calculated according to the desired module package. This desired module package configuration value is then compared with supplied module package configuration values. The module package with a module package configuration value that deviates least from the desired module package configuration value is then selected. This module package is then arranged in the cabin. Since these supplied module packages are generally already certified and comply with the technical and legal rules, the user does not have to think about this anymore.

The selected module package, which in the example just quoted has a galley module, a staircase module and a toilet module, is in particular arranged according to existing connections in the parameter zone. Individual modules and the module packages composed of individual modules comprise in particular system connections, systems and structural parts in order to define the aircraft completely. The individual modules also preferably comprise a floor module.

In a further exemplary embodiment of the invention at least one individual component is formed as a passenger seat. In this case the individual component configuration in particular predetermines a seat pitch between the passenger seats. In this case the seat pitch is defined as the spacing between a first passenger seat and a second passenger seat arranged opposite the first passenger seat. The individual component configuration can preferably predetermine a passenger seat width and/or a number of passenger seats in a row of passenger seats.

According to yet another preferred embodiment of the invention the parameter zone is provided as an entry zone and/or the dynamic zone is provided as a passenger zone. The entry zone comprises in particular an entry region having an entrance with a cabin door, through which passengers can enter the cabin or can leave the cabin. In particular at least one galley module and/or at least one toilet module and/or at least one crew seat module, in particular one crew seat, are arranged in the entry zone. The passenger zone preferably comprises at least one passenger seat and/or at least one row of passenger seats, in particular at least one passenger seat row module. In an advantageous manner, the invention enables a user to configure or equip the parameter zone in particular from already preconfigured module packages, wherein the user does not have to know where the individual connections for joining the module packages are arranged. The parameter zone configuration, i.e. the individual module configuration, is then calculated dynamically on the basis of the individual module selection. Because only one calculation has to be carried out for the parameter zone configuration, considerable savings of computing capacity can be made.

According to another exemplary embodiment of the invention the calculation of the individual component configuration of the dynamic zone continues to be carried out dependent upon at least one dynamic zone parameter. One such dynamic zone parameter may for example be a passenger seat pitch. Thus the user can in particular specify that for example the last two rows of passenger seats should have a predetermined pitch. The pitch of the further rows of passenger seats is then automatically adapted. It may be provided that the dynamic zone parameter includes an adjustability of a seat back of a passenger seat. For example a user can specify that the passenger seats in the last row of passenger seats do not have adjustable seat backs. Thus such a last row of passenger seats requires less space than a row of passenger seats with adjustable seat backs. Thus the user can in particular specify a strategy as to how a passenger seat row layout should look. In this case the user does not have to have any idea about an optimal arrangement of the rows of passenger seats, since the optimal arrangement can be quickly calculated by means of the dynamic adaptation according to the invention of the individual component configuration to the predetermined individual module configuration of the parameter zone.

According to a particularly preferred embodiment of the invention an individual component parts list is produced according to the calculated individual component configuration. It may also be provided that in particular a CAD construction plan of the parameter zone and/or the dynamic zone is created. By way of example the method according to the invention can be carried out on a manufacturing plant for cabins, so that an individual module configuration or module package configuration and/or a calculated individual component configuration can be directly converted into a real assembly. The individual module configuration or the module package configuration and/or the calculated individual component configuration are preferably first of all simulated virtually, for example in a three-dimensional view, before a real assembly is carried out.

In another exemplary embodiment of the invention the selected module packages and/or the individual components are arranged in the parameter zone or the dynamic zone respectively if the corresponding arrangement has previously been validated.

Within the meaning of the invention "validation" and "validated" mean that a part construction plan is valid ("validated") if the airplane component specified therein satisfies structural design requirements and the requirements ("rules") of the Federal Civil Aviation offices. The process of testing whether the part construction plan satisfies these requirements and the rules is called "validation". A part construction plan may in particular comprise an individual module, a module package and/or an individual component. It may in particular be provided that after each selection of an individual module a check is performed as to whether a corresponding arrangement is valid. It may also be provided for example that a validation is only carried out after a predetermined number of selected individual modules or module packages. Savings of computing time and computing capacity can be made here in an advantageous manner. It may also be provided for example that a user can have a validation carried out manually.

If this is so, then the validation is successful. If not, then for example a warning message is output to a user, in particular in the form of a pop-up window on a screen or the configuration is not allowed, and the user is guided to a similar buildable solution. The user should then revise an input so that a new validation can be started.

However, it is also possible here that invalid selection possibilities/options are a priori ruled out ("grayed out") and if appropriate in the attempt of selection a more detailed reasoning is given with regard to the contravention of the rule. Thus the user may comprehend where the problem lies and possibly at a different location can alter the product so that the option is again enabled. Thus if for example the user selects a galley module and disabled toilet module, wherein these two modules cannot be arranged jointly in a subdivided entry zone because of their size, this is indicated to the user and he can then revise his original selection, for example by selecting the galley module.

In a further preferred embodiment of the invention a user input is captured before the arrangement of the selected module package in the cabin. In particular the user input may comprise shifting and/or removal and/or addition and/or replacement and/or modification of an individual module. This is helpful in particular when the airplane manufacturer has predetermined a basic configuration that is adapted by the customer to his requirements. This may also be a purely virtual basic configuration, i.e. this does not necessarily have to be physically present in an airplane cabin. Furthermore in this way a user can change the layout before the actual arrangement of the module package in the cabin or in a parameter zone. Then a new desired module package configuration value is calculated in accordance with the changed desired module package. This new desired module package configuration value is then compared with supplied module package configuration values. It may preferably be provided that the user input is captured before the comparison of the desired module package configuration value with the supplied module package configuration values. Alternatively or additionally it may for example be provided that the user input is captured after the selection of the module package, of which the module package configuration value deviates least from the desired module package configuration value, and before the arrangement of the selected module package in the cabin.

According to a preferred embodiment a system for configuration of a cabin of an aircraft may have an input device for capturing a user input, a configuration device connected to the input device, wherein the configuration device has a processor and a memory device for storing the data of the pool of individual modules, and a display unit for displaying the desired module package (10a) and the selected module package (10b), wherein the system comprises an automatic individual module store. In this case the individual module store may for example be a fully-automated high-rack warehouse in which the individual modules are stored and after appropriate selection are called off and made available. As a result considerable savings can be made when equipping the cabins at large aircraft works with a large number of different configurable airplanes.

DESCRIPTION OF PREFERRED EMBODIMENTS

Figure 2:
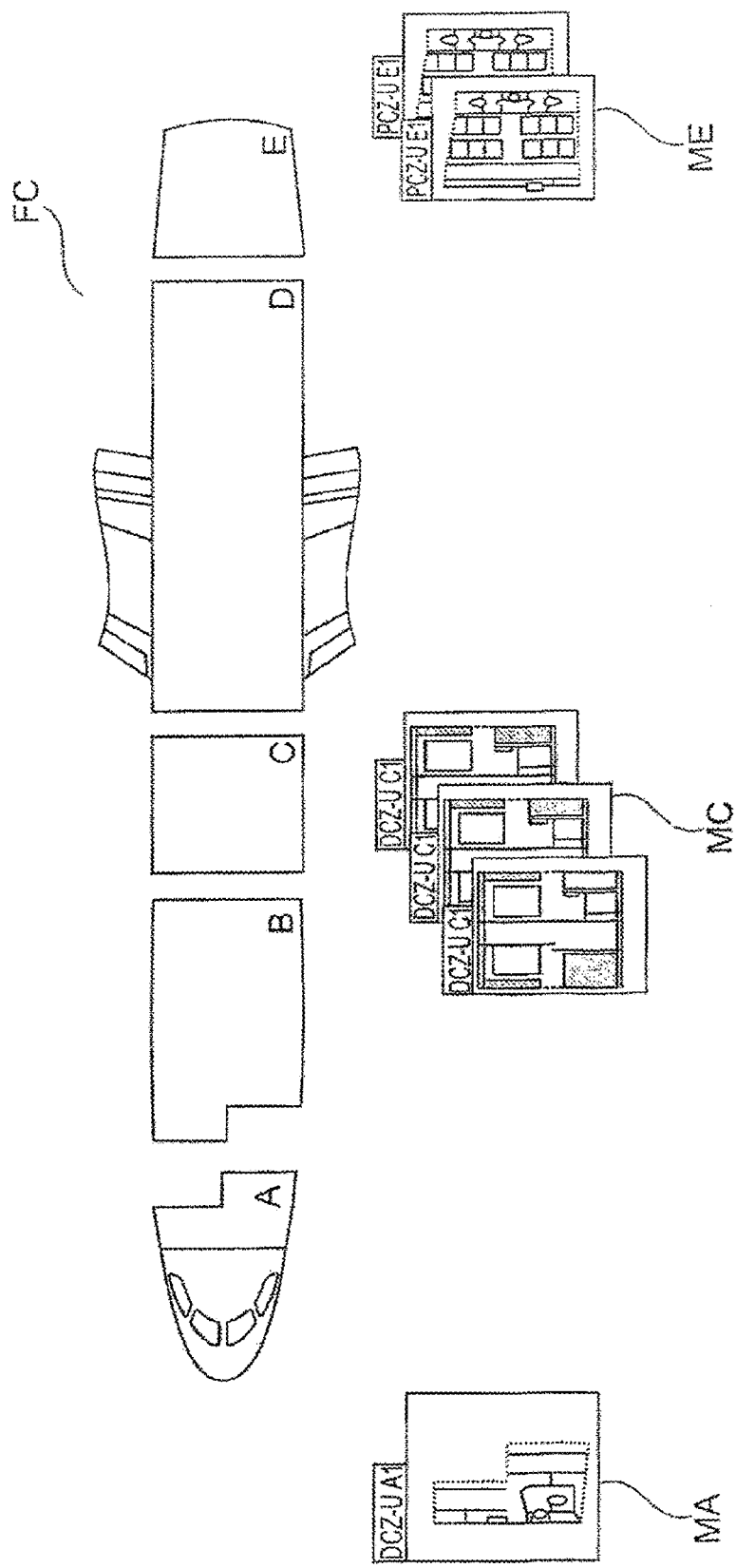
Figure 3A:
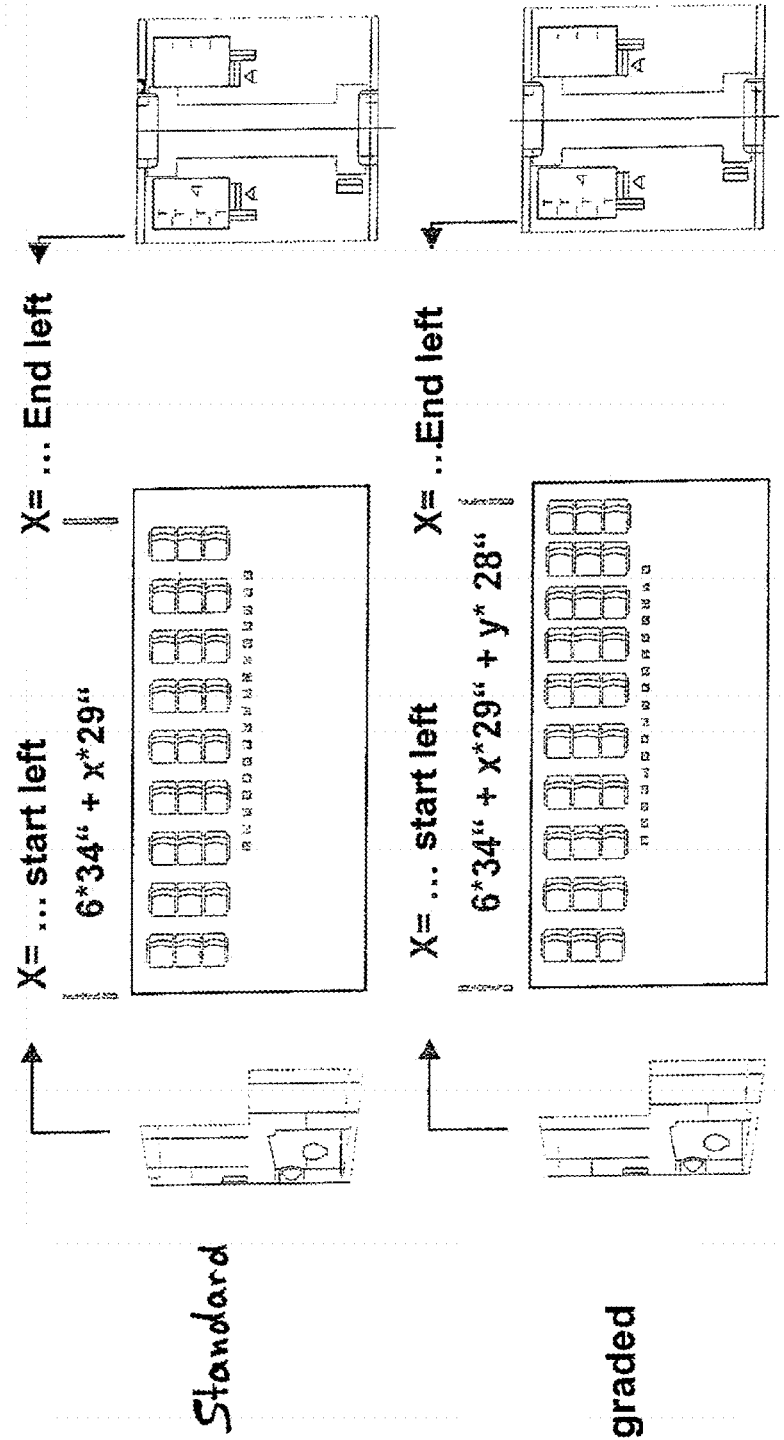
Figure 3B:
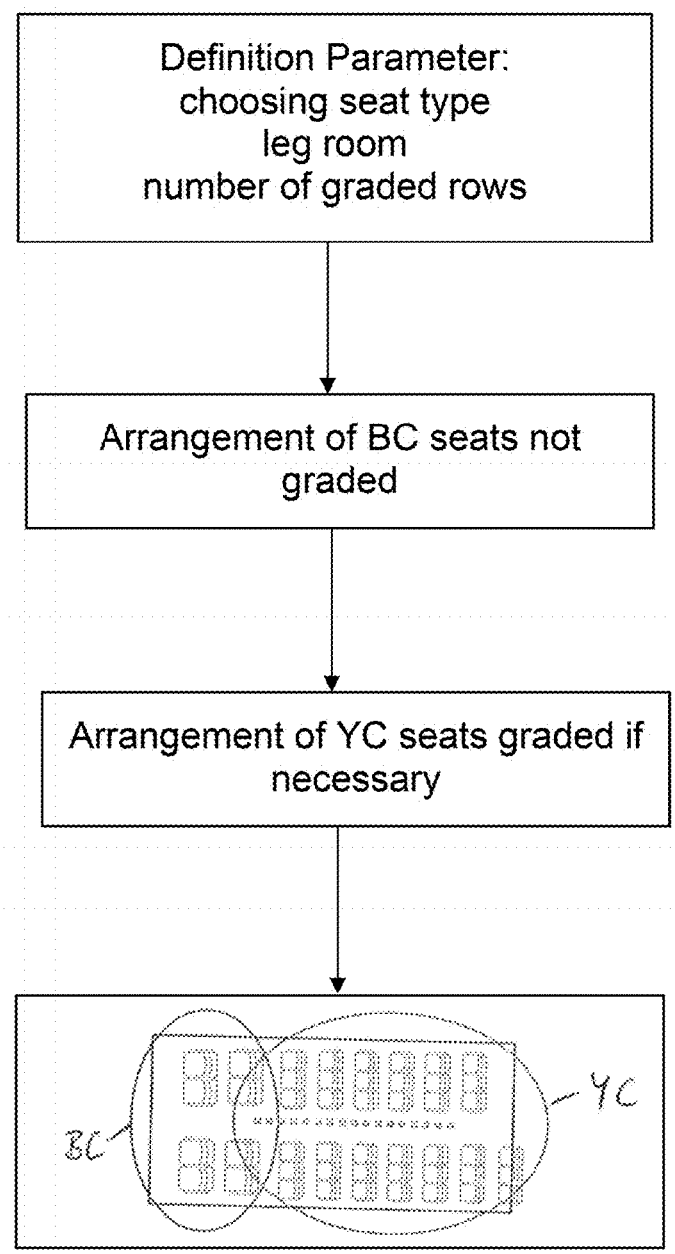
Figure 4:
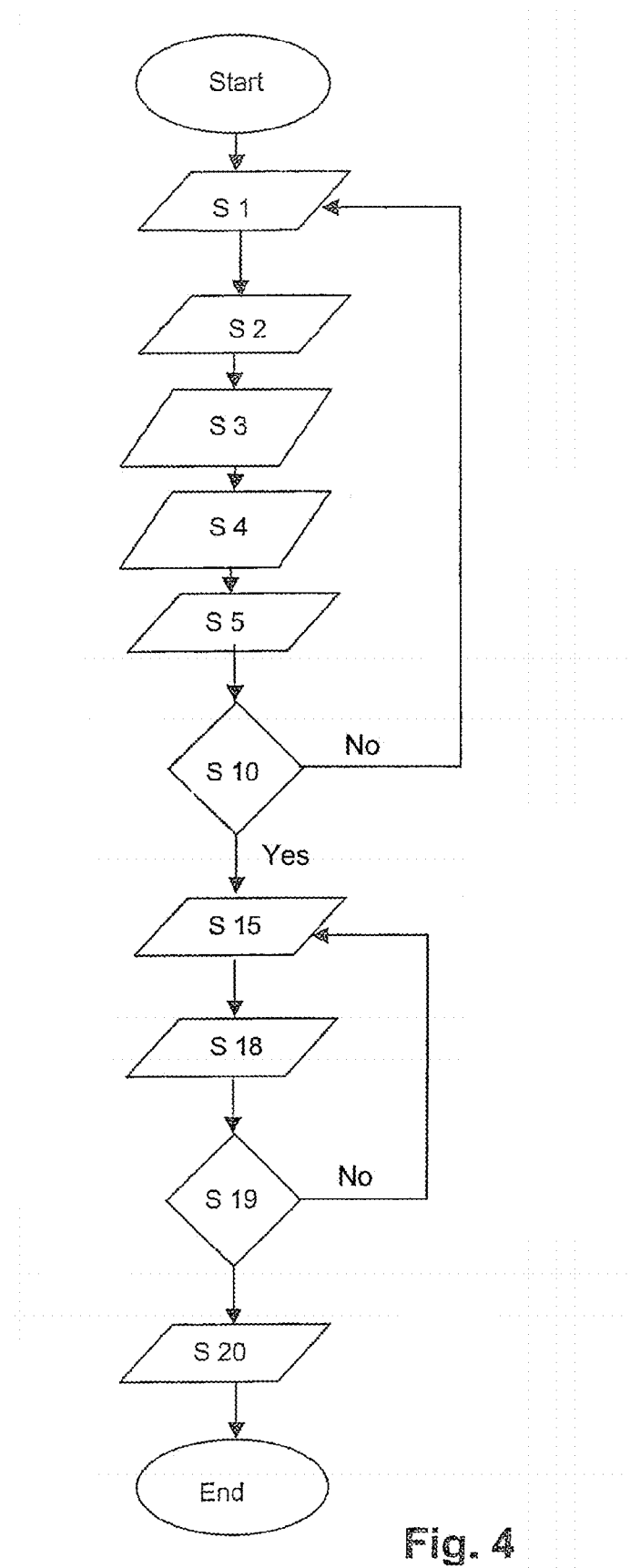
Figure 5:
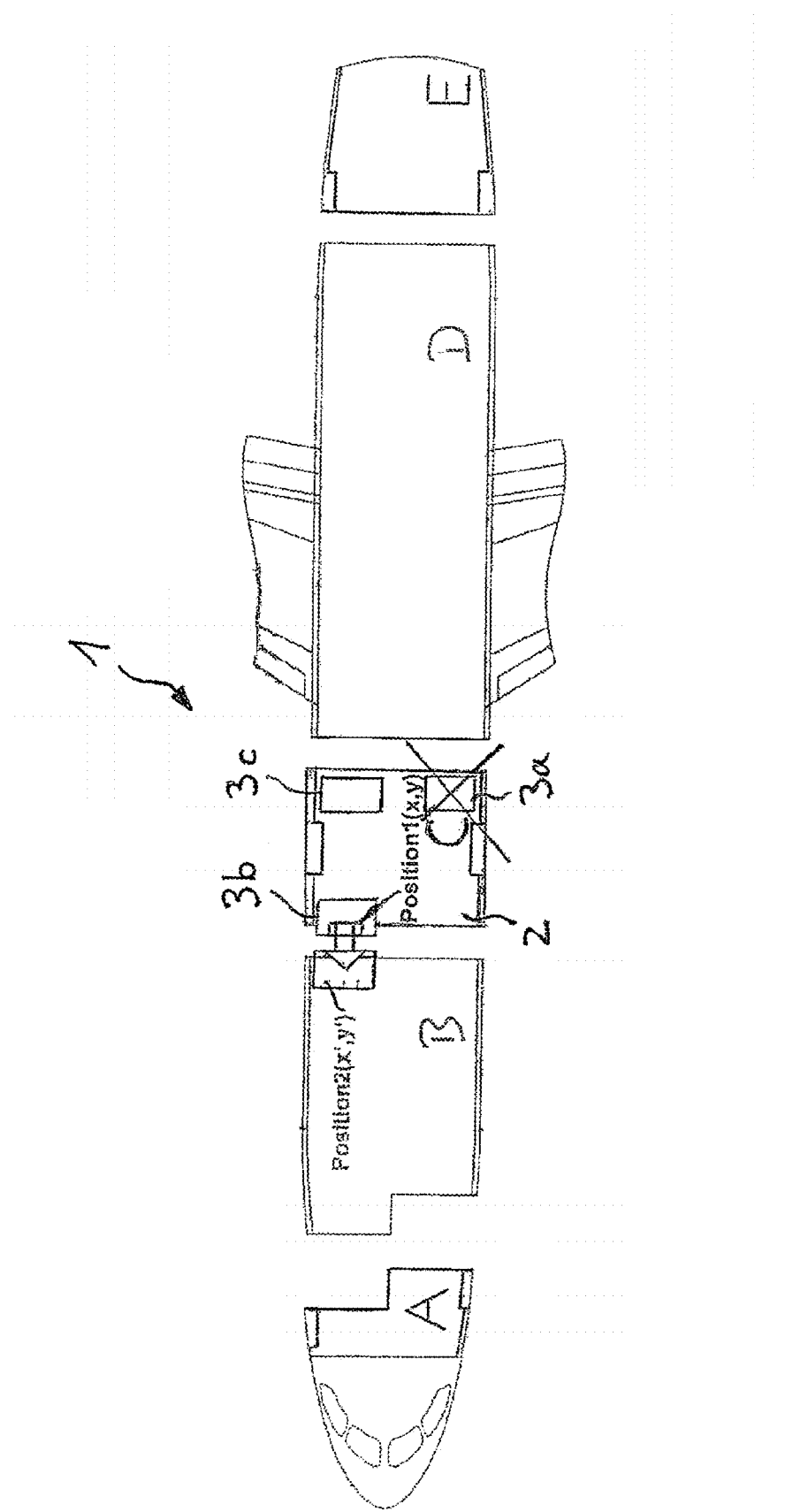
Figure 6:
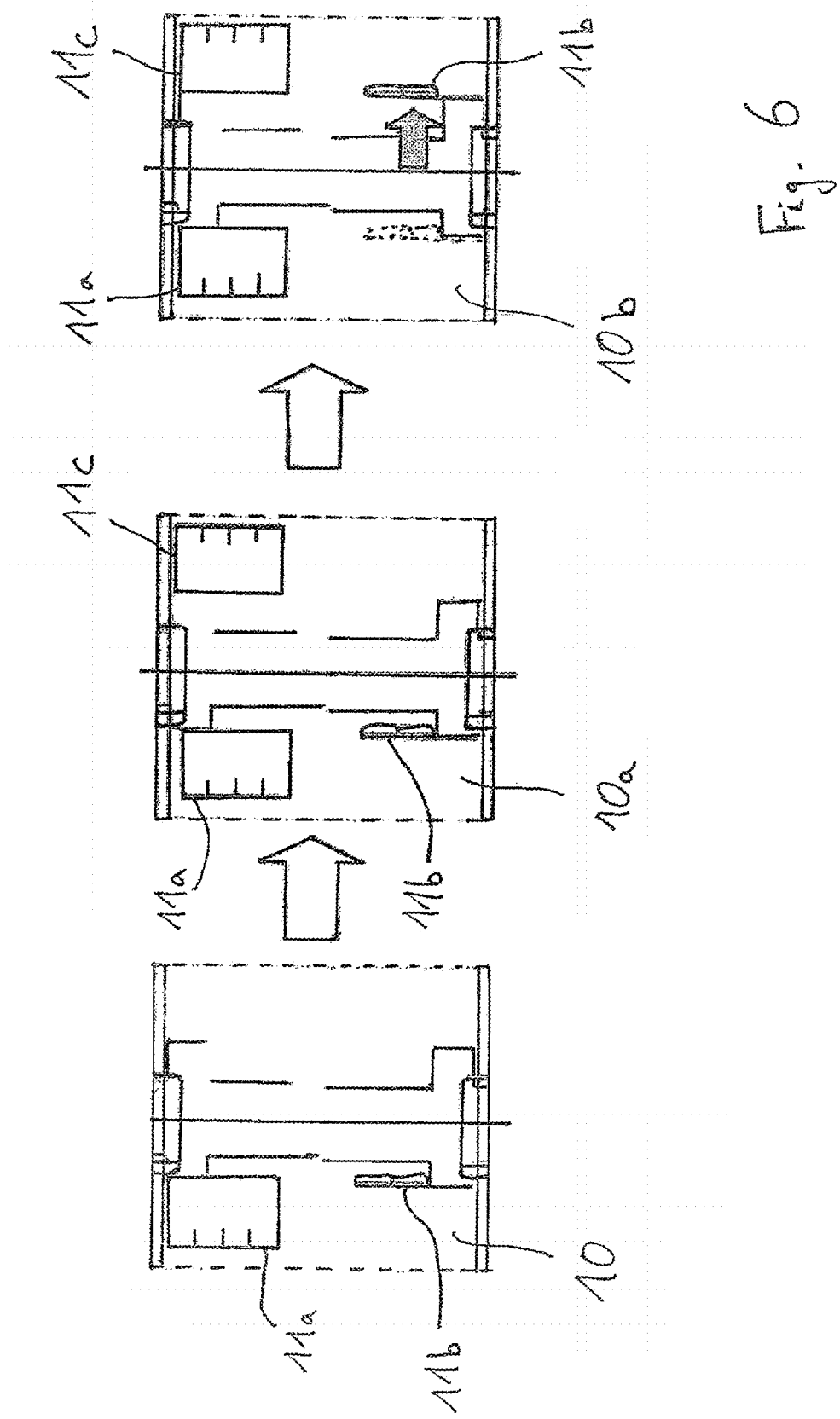
Figure 7:
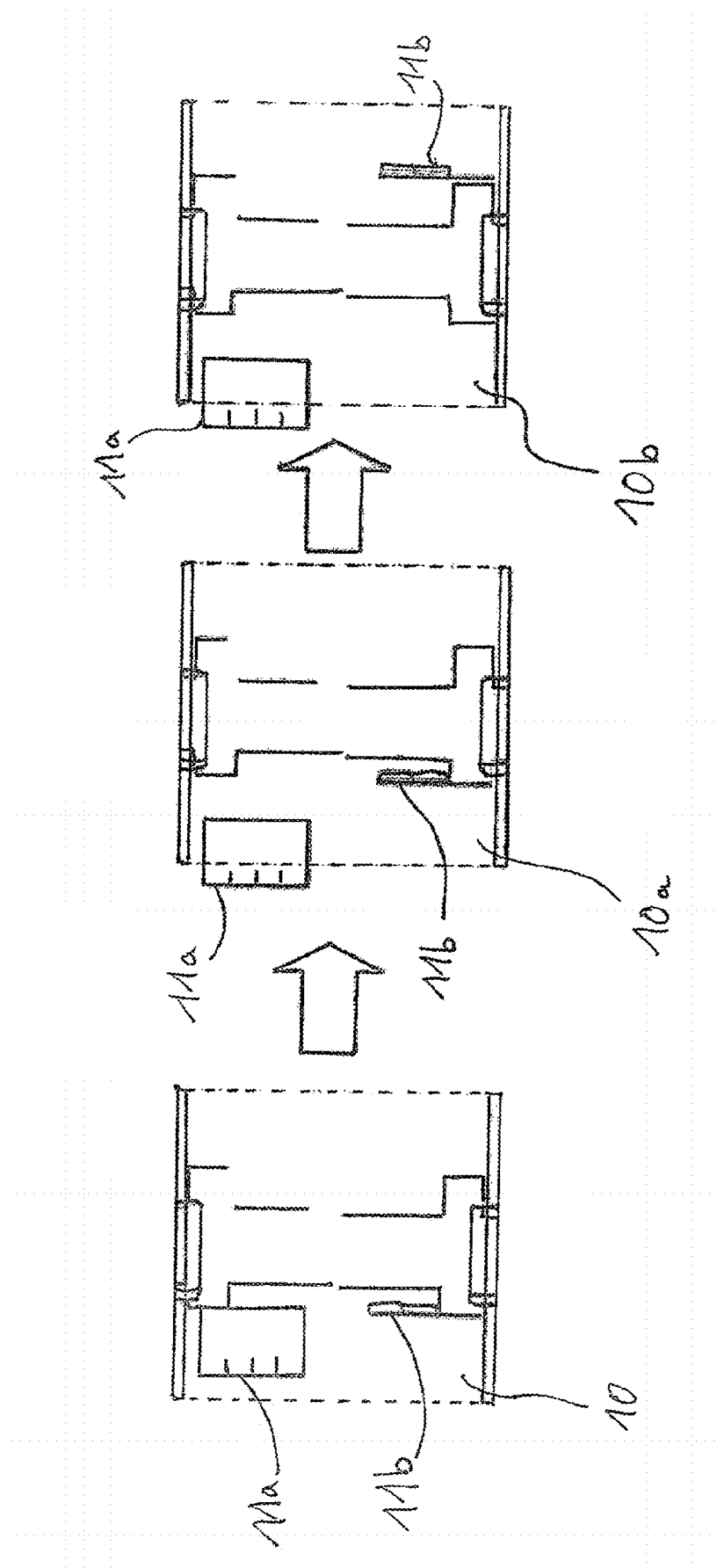

The invention is explained below in greater detail on the basis of preferred embodiments with reference to the drawings. In the drawings:

FIG. 1 shows a schematic block diagram of a production or manufacturing plant with an embodiment of the system according to the invention, FIG. 2 shows an airplane cabin made up of modules, FIGS. 3a and 3b show an individual component configuration schematically, FIG. 4 shows a schematic flow chart of an embodiment of the method according to the invention, FIG. 5 shows an airplane cabin made up of modules, FIG. 6 shows a module package, wherein a further individual module is added, and FIG. 7 shows a further module package, wherein an individual module is shifted.

FIG. 1 shows schematically a system VEB, which in the illustrated embodiment is set up for automatic production of installation plans and parts lists for a cabin configuration or equipment therefor. Furthermore the system may also have an interface CON that is suitable for direct transfer of planning and installation data to a manufacturing plant MANU. This means that processes in logistics (procurement of components and stock-keeping in automatic high-rack warehouses, etc.), process planning, process scheduling, provision of operating materials, and the like can be directly controlled and automated. This has direct effects on the physical equipment the cabin or the installation. Moreover may the system for example simulate the configuration of the cabin and display it in 3D. A module or an individual module is for example a galley or toilet cabin module.

The system VEB comprises a processor or computer PD, in particular comprising a processor that is controlled by an engineer or customer ("user") via a user interface UI or input device. The user interface UI in this case may be a graphical user interface (GUI) in which the control takes place via a menu structure that is known per se.

The user inputs his required selection for the configuration of the parameter zone via the user interface UI. In this case in particular the options for the element of the system are set automatically and the dimensioning/positioning is predetermined invariably by the individual modules or the module packages.

Technical parameters for galley or toilet cabin modules, as used in passenger cabins, would be for example the water pressure required by the user for the pipework or the specification of electrical wiring with regard to the electrical power for galley equipment in the galley cabins. As a rule, however, these parameters are not configured but the options for the element and the "parameters" can then be derived from the configuration.

Accordingly rules ensure that these parameters are in a valid range, that is to say they are in particular feasible. The individual module parameters comprise these technical parameters.

A pool of already validated partial construction plans that may preferably comprise module packages and/or individual modules, from which the later construction plan SPEC is combined, are available on a database system DB, wherein the database system DB is stored in a memory device (not shown). Furthermore individual components can also be made available on the database system.

The partial construction plans and also the construction plan SPEC to be produced and in particular the individual modules can for example be provided as structured XML files.

A validation unit VAL is connected for communication purposes to the computer PD and a rule database DBV. Rules and technical specifications predetermined by the Federal Civil Aviation offices are stored in the rule database DBV for example in tabular data structures. The tabular data structure comprises for example at least two columns. In addition to these rules, that are in particular associated with the "options" not described in greater detail here, global rules are also observed. There are product-specific rules that define the efficiency of the product and so guarantee feasibility.

For example the overall power consumption of the cabin is not managed by local limitations. Moreover there may also be rules governing the airplane model and the zone to which a module package or individual module is to be assigned.

Identifiers for the respective modifiable elements of the partial construction plans are stored in one column. Such elements may for example be a color or a seat cover material. In the associated line in the second column the respective specification value is shown, for example as a code, numerical values or as a numerical range. Thus for example a color for a seat cover of a seat can be coded.

The appropriate features of the already pre-validated partial construction plans or pre-validated individual modules or module packages then takes place on the basis of the technical parameters derived from the options. This takes place by writing of the parameter into the corresponding element or module feature at the corresponding location in the XML-coded partial construction plan.

According to a further feature one or more of the individual elements within the already validated partial construction plans are either linked to one another or to elements in other already validated partial construction plans. This linking may extend to module features in module levels of the module partial construction plans. A dynamic-automatic (co-)modification of the other elements or module features linked to this element then takes place by modification of the element. The setting of these links is rule-based and also based on considerations that are necessary in design terms or on requirements of the national Federal Civil Aviation offices.

This means that the selected module packages and/or the individual modules are arranged in accordance with the design-related framework conditions and the requirements of the national Federal Civil Aviation offices, in particular connected to one another.

The partial construction plans are then combined by the computer PD. This combining may for example take place by merging of the individual XML files into a complete XML file, or also by connecting the partial construction plans to be combined via links.

However, the partial construction plans are actually only combined in particular when the validation unit VAL does not register any violation of the rules stored in the rule database DBV. The validation unit VAL may for example be formed as a "parser" that goes through the respective entries in the partial construction plans and compares the parameters entered there as new element or module feature with the values in the second column of the table in the rule database DBV. If a match is registered for each feature, that is to say if the value input by the user corresponds to the value in the second column of the table, the combination is deemed to be validated. Due to the linking a modification at the module level may also have the consequence that the validation also may not be successful. If it is not successful a signal is transmitted by the validation unit VAL to the computer PD. The computer PD will then transmit a warning signal to the user and will wait for input of revised parameters.

Thus the user predetermines the configuration of the parameter zone by selecting one or more individual modules which are initially combined into a desired module package. However, the module package with a module package configuration value that deviates least from the desired module package configuration value is then selected for the actual arrangement. This arrangement is then validated by means of the validation unit VAL. A calculation of an individual component configuration takes place only if the parameter zone configuration has been validated.

The final construction plan SPEC then obtained can then be fed in for example into a suitable "back end" for further processing. For example, the final construction plan SPEC can be passed to a computer aided design (CAD) system in order to produce a graphical overall plan. This can then for example be cross-checked by an engineer.

Alternatively or additionally the final construction plan SPEC can also be fed into a control device or interface CON so that via this control device CON a manufacturing plant MANU can be supplied with those parts or individual components and/or module packages that were specified in the finished construction plan SPEC.

Also for example industrial manufacturing robots, or low-floor vehicles in warehouses, can be controlled in order to provide components or structural parts having the particular dimensions or characteristics that are specified in the final construction plan SPEC or to supply or pre-install them at a predetermined target location for final installation.

In the following FIGS. 2 and 3, to simplify the illustration the modules and elements or the specification thereof as module partial construction plans are designated by the same reference signs.

FIG. 2 shows an overview of a modular airplane component. The airplane component is an airplane cabin FC. FC has a layout consisting of different zones A-E. In this example the zones are distinguished by the fact that doors are arranged in the zones A, C, E and none are arranged in the zones B, D. In this respect the zones A, C, E are formed as entry zones, so-called parameter zones, and the zones B and D are formed as passenger zones, so-called dynamic zones.

The rows of passenger seats are formed of passenger seats that are arranged in the passenger zones B and D (see also FIG. 3). MA and ME identify crew seat modules that are arranged in the zones A and E. MC identifies a module package formed from a galley module and a toilet module, wherein the module MC is arranged in the zone C.

FIGS. 3a and 3b show schematically an individual component configuration in the passenger zones B, D of FIG. 2. The individual component configuration is formed here by means of passenger seats. The entry zones A, C according to FIG. 2 that adjoin the passenger zones B and D define a fixed start position and a fixed end position for the rows of passenger seats. The row of passenger seats shown at the top in FIG. 3a is formed in a so-called standard configuration or non-graded configuration. The row of passenger seats shown at the bottom in FIG. 3a is formed in a so-called graded configuration. In the graded configuration at least one row of passenger seats is arranged both in the passenger zone and in the entry zone. This row of passenger seats projects, in a manner of speaking, into the entry zone. It may in particular be provided that the graded configuration is used for economy class (YC class) and the non-graded configuration is used for business class (BC class). It may also be provided that the corresponding rows of passenger seats for economy and business class are arranged jointly in a passenger zone (see FIG. 3b).

According to the flow chart in FIG. 3b the parameter definition occurs first. This includes the selection and number of seat types, e.g. BC (business class)=8. In this example the legroom BC=34", in the first row BC=53". In economy class (YC) the legroom is for example YC=29", in the first row YC=48". The number of graded rows in this example is 4. Secondly, as shown in FIG. 3b, the BC seats are arranged in a non-graded manner and thirdly the YC seats are arranged in a graded manner, if necessary.

For the calculation of the optimal arrangement of the individual rows of passenger seats an algorithm $Y=f(X)$ may in particular be used that takes into account a curvature of the cabin, a required aisle width and/or passenger seat rail properties. On the basis of the input parameters the algorithm calculates the individual module parameters of the parameter zone and in particular on the basis of the formulae shown in FIGS. 3a and 3b the algorithm calculates an optimal position of the respective rows of passenger seats. In particular the number of passenger seats that can be arranged per row of passenger seats is also calculated.

According to the preferred embodiment the entry zones adjoining the passenger zones form a parameter zone. The passenger zones are configured dynamically according to the parameter zones that are thus completely configured and in this respect form a dynamic zone.

In order to save computing time during the validation by the validation unit VAL, the validation does not take place after every selection of a module, but for example only after the user has ended his selection. This is made possible in particular by the fact that the partial construction plans or individual module and the module packages are already pre-validated in the database DB.

An XML coding of the module partial construction plan MB may for example appear as follows:

```
< module MA: module feature MA 1=ma 1, >
    <element S: element feature S 1=s_1, ...>
```

A "flag" in the element feature "with monitor?" (S_1) has then been modified or set here to "yes" (s_1).

The validation unit VAL, the computer PD and the database system DB, DBV or the user interface UI can each be formed as discrete hardware or software modules.

According to one embodiment the implementation takes place on one single local computer.

According to one embodiment a client server structure is provided for a web-based embodiment of the validation device VEB. In this case the technical specification data is provided via the customer (for example the airline that wishes to order an airplane) from a client on which the user interface UI is presented. A data exchange with the computer PD ("server") then takes place via a network connection, such as for example the internet. PD is in turn connected via the network to the database system DBV or DB. If the finished construction plan SPEC has been validated and combined, it can then be sent via the network connection to the control unit CON in order to co-ordinate the further final installation in the plant MANU.

For clarification FIG. 4 shows a flow diagram of an embodiment of the method according to the invention.

A selection of at least one individual module from a pool of individual modules takes place in a first stage S1.

Then in a step S2 the individual modules selected in step S1 are joined to form a desired module package. Thus here the user predetermines his desired configuration relative to the cabin layout.

In a subsequent step S3 a desired module package configuration value is then calculated and is compared with supplied module package configuration values in a step S4, wherein these correspond in each case to a module package.

For the configuration of the parameter zone the module package with a module package configuration value that deviates least from the desired module package configuration value is then selected in a step S5.

Then a validation of the parameter zone configuration takes place in the stage S10. If in this case it is ascertained that the parameter zone configuration is not valid, that is to say is not permissible, a user must make a new selection and the validation is then carried out again.

If the validation was successful, in a stage S15 one or more individual components is/are selected from a pool of individual components.

In step S18 an individual component configuration is calculated according to the validated individual module configuration, i.e. the validated module package. Also the individual component configuration is validated in a step S19. If the validation was not successful, the user must make a new selection of individual components, whereupon a new individual component configuration is then calculated.

If the validation is successful, the validated module partial construction plans, that is to say the individual module configuration or the module package and the individual component configuration, are put together in the stage S20, in order thus to obtain a validated final construction plan SPEC. Then the database DB can be updated by storage of the validated construction plan SPEC, together with an ID (identification number) of the customer. By iterative application of the method described above, starting from the valid construction plan SPEC as a new "partial construction plan", a complete construction plan for the entire airplane can then be produced successively with the aid of a computer by the system VEB.

To summarize, by means of the invention it is possible in particular, based upon a predetermined or completely configured parameter zone, for the positions of the individual passenger seats and/or the individual rows of passenger seats, in particular the pitches, to be calculated, that is to say to be adapted dynamically to the dynamic zone. In this case it may in particular be provided that the passenger seats are anchored to the cabin floor by means of a guide rail.

FIG. 5 shows a further airplane cabin 1 made up of modules, wherein the airplane cabin 1 is subdivided into a plurality of zones A, B, C, D and E. A module package 2 consisting of three individual modules 3a, 3b and 3c is arranged in zone C. The three individual modules 3a, 3b and 3c may be different or the same. A user wishes to change the existing cabin layout by deleting or removing the individual module 3a and shifting the individual module 3b from a first position to a second position. The position of the individual module 3c remains unchanged. The cabin layout thus changed by the user does not generally meet the technical and legal specifications. Therefore the module package that comes closest to the desired configuration of the user is selected from a pool of supplied validated module packages. In particular this takes account of whether already other module packages are already arranged in the cabin, for example in the zone C or D. The module package with a module package configuration value that deviates least from the desired module package configuration value is then selected, but does not fit with module packages already present. For example the corresponding connections are not compatible with one another or each have different positions. Exceptionally it may then be possible that a module package that deviates further from the desired cabin layout of the user is also selected. For example a respective weighting parameter of the module package configuration values can take account of this circumstance. An appropriate selection algorithm can be chosen for this.

FIGS. 6 and 7 are intended to explain the method in greater detail below, by way of example and schematically, when a user adds or shifts an individual module.

FIG. 6 shows a module package 10 with individual modules 11a and 11b. In the embodiment shown here the individual module 11a is a galley module and the individual module 11b is a crew seat module. The user now adds a further individual module 11c that in the embodiment shown here is a toilet module. The middle image in FIG. 6 shows the layout configuration required by the user or the desired module package 10a required by the user. The module package 10b that comes closest to the desired module package is shown in the right-hand image in FIG. 6. Here the individual module 11b has been shifted to the right.

FIG. 7 shows the module package 10 from FIG. 6 with the individual modules 11a and 11b. Here, however, the user merely shifts the individual module 11a to the left, so that it protrudes into a zone adjoining the module package 10. For example it can protrude into the zone B as shown in FIG. 5. The desired module package 10a is shown in the middle image in FIG. 7. The right-hand image in FIG. 7 shows the module package 10b that deviates least from the desired module package 10a. Here the individual module 11b has merely been shifted to the right in order in particular to take account of the change of the center of gravity of the module package 10a due to the shifting of the individual module 11a.

When evaluating which module package best matches the module package predetermined by the user, the following criteria are in particular taken into account:
  change in the number or the position of the individual modules in the same zone and/or
  change in other module packages, in particular if in these module packages individual modules are displaced, amended, added and/or removed.

Furthermore it may be provided that the evaluation takes into account whether the selected module package is or is not compatible with module packages already present. For example, in the event of changes in the number and the arrangement of the individual modules, in particular in the case of crew seat modules or passenger seats, an additional sanction parameter enters into the evaluation. In this case it may preferably be prohibited that module packages already present in other zones are changed, that is to say in particular in these present module packages no individual modules are added, changed or shifted.

The best matched module package is selected and presented to the user. In this case it may in particular be provided that further module packages for other zones are automatically selected.

The method according to the invention enables an automatic selection of the best matched module package for production of layouts of cabins of an aircraft, in particular of airplane cabins, based on a module package for layout configuration taking into account all approval-related rules and regulations, in the context the configuration and/or equipment. In this case the layout is composed of individual modules and the module package best matched to this layout is automatically identified and selected.

Furthermore the method makes it possible that after a change to an individual module in a module package the best matched module package is identified. The identified module package is preferably checked as to whether it can be combined with other module packages already arranged in the individual zones. The degree of freedom of the configuration of an individual module is limited with regard to the solution space at the module package level according to the modification methods, that is to say for example change of type, deletion, addition and/or shifting, and thus guarantees the mapping to an existing module package, in particular a validated module package. Thus in an advantageous manner a cabin layout can be configured quickly and efficiently, even with a large number of module packages available. Thus savings can be made in particular on computing time and computing capacity.

The invention is not limited by the described embodiments but encompasses all the variants that are included in the scope of protection of the claims. Thus it is possible for example that the physical equipment of the cabin takes place by means of individual modules and/or module packages supplied from an automatic individual module store. In this case the individual module store may be constructed as an automatic high-rack warehouse controlled by the system. Also the equipment the cabin or the pre-assembly of module packages can take place by means of automatically controlled industrial robots.

The invention claimed is:

1. A method for automatically configuring a vehicle cabin comprising:
   selecting, by a computing device, a plurality of individual modules from a pool of individual modules for automatic arrangement in a virtual representation of the vehicle cabin, wherein the virtual representation of the vehicle cabin is subdivided into a plurality of zones;
   joining, by the computing device, the selected plurality of individual modules to form a desired module package;
   automatically calculating, by the computing device, a desired module package configuration value, wherein the desired module package configuration value comprises one of a number of individual modules in the desired module package, a permissible weight of the desired module package, a center of gravity of the desired module package, or a minimum distance between one individual module of the desired module package and an individual component;
   automatically comparing, by the computing device, the desired module package configuration value with predefined module package configuration values, which each correspond to a different technical pre-validated module package of a plurality of technical pre-validated module packages;
   automatically selecting, by the computing device, a technical pre-validated module package, of the plurality of technical pre-validated module packages, having the predefined module package configuration value that deviates least from the desired module package configuration value;
   arranging, by the computing device, the selected technical pre-validated module package in a zone, of the plurality of zones, of the virtual representation of the vehicle cabin to produce a validated construction plan for the vehicle cabin; and
   physically arranging the vehicle cabin based on the validated construction plan for the vehicle cabin.

2. The method according to claim 1, wherein at least one of the plurality of zones is designed as an entry zone and at least one further zone of the plurality of zones is designed as a passenger zone.

3. The method according to claim 1, wherein the selected plurality of individual modules comprises a connection position selected from the group consisting of: a hydraulic connection, electrical connection, a mechanical connection, and combinations thereof.

4. The method according to claim 1, wherein the pool of individual modules comprises an individual module selected from the group consisting of: a staircase module, a galley module, a toilet module, a crew seat module, an emergency equipment module, an oxygen supply module, a multimedia module, a cabin interior cladding module, and combinations thereof.

5. The method according to claim 1, wherein a user input is received before the arrangement of the selected technical pre-validated module package in the virtual representation of the vehicle cabin.

6. The method according to claim 5, wherein the user input comprises instructions for an alteration of an individual module of the selected technical pre-validated module package selected from the group consisting of: shifting, removal, addition, replacement, modification, and combinations thereof.

7. A system for configuring a vehicle cabin comprising:
   a user input device configured to capture a user input;
   a configuration device comprising a non-transitory computer-readable medium configured to store a pool of individual modules, and a processor in operative communication with the user input device, wherein the non-transitory computer-readable medium comprises computer-executable instructions that when executed by the processor cause the processor to perform a method comprising:
   based upon the user input received from the user input device, selecting a plurality of individual modules from the pool of individual modules for automatic arrangement in a virtual representation of the vehicle cabin, wherein the vehicle cabin is subdivided into a plurality of zones;
   joining the selected plurality of individual modules to form a desired module package;
   automatically calculating with the processor, a desired module package configuration value, wherein the desired module package configuration value comprises one of a number of individual modules in the desired module package, a permissible weight of the desired module package, a center of gravity of the desired module package, or a minimum distance between one individual module of the desired module package and an individual component;
   automatically comparing with the processor, the desired module package configuration value with predefined module package configuration values, which each correspond to a different technical pre-validated module package of a plurality of technical pre-validated module packages;

selecting a technical pre-validated module package, of the plurality of technical pre-validated module packages, based on the comparing; and displaying on a display unit, the desired module package and the selected technical pre-validated module package;

wherein the system also has a control unit for coordinating a final physical installation of the vehicle cabin in a plant, wherein the final physical installation is based on the selected technical pre-validated module package.

8. The system for configuration of a cabin according to claim 7, wherein the system further comprises an automatic individual module store.

9. The system according to claim 7, wherein at least one of the plurality of zones is designed as an entry zone and at least one further zone of the plurality of zones is designed as a passenger zone.

10. The system according to claim 7, wherein the selected plurality of individual modules comprises a connection position selected from the group consisting of: a hydraulic connection, electrical connection, a mechanical connection, and combinations thereof.

11. The system according to claim 7, wherein the pool of individual modules comprises an individual module selected from the group consisting of: a staircase module, a galley module, a toilet module, a crew seat module, an emergency equipment module, in particular an oxygen supply module, a multimedia module, a cabin interior cladding module, and combinations thereof.

12. The system according to claim 7, wherein the user input is received before arrangement of the selected technical pre-validated module package in the virtual representation of the vehicle cabin.

13. The system according to claim 12, wherein the user input comprises instructions to alter an individual module of the selected technical pre-validated module package with an alteration selected from the group consisting of: shifting, removal, addition, replacement, modification, and combinations thereof.

14. A non-transitory computer-readable medium comprising computer-executable instructions, that when executed by a processor, are configured to perform a method comprising:

selecting a plurality of individual modules from a pool of individual modules for automatic arrangement in a virtual representation of a vehicle cabin, wherein the vehicle cabin is subdivided into a plurality of zones;

joining the selected plurality of individual modules to form a desired module package;

automatically calculating a desired module package configuration value, wherein the desired module package configuration value comprises one of a number of individual modules in the desired module package, a permissible weight of the desired module package, a center of gravity of the desired module package, or a minimum distance between one individual module of the desired module package and an individual component;

automatically comparing the desired module package configuration value with predefined module package configuration values, which each correspond to a different technical pre-validated module package of a plurality of technical pre-validated module packages;

automatically selecting a technical pre-validated module package, of the plurality of technical pre-validated module packages, having the predefined module package configuration value that deviates least from the desired module package configuration value;

arranging the selected technical pre-validated module package in a zone of the plurality of zones of the virtual representation of the vehicle cabin to produce a validated construction plan for the vehicle cabin; and outputting the validated construction plan for the vehicle cabin, wherein the validated construction plan is used to physically arrange the vehicle cabin.

15. The non-transitory computer-readable medium of claim 14, wherein at least one of the plurality of zones is designed as an entry zone and at least one further zone of the plurality of zones is designed as a passenger zone.

16. The non-transitory computer-readable medium of claim 14, wherein the selected plurality of individual modules comprises a connection position selected from the group consisting of: a hydraulic connection, electrical connection, a mechanical connection, and combinations thereof.

17. The non-transitory computer-readable medium of claim 14, wherein the pool of individual modules comprises an individual module selected from the group consisting of: a staircase module, a galley module, a toilet module, a crew seat module, an emergency equipment module, an oxygen supply module, a multimedia module, a cabin interior cladding module, and combinations thereof.

18. The non-transitory computer-readable medium of claim 14, wherein a user input is received before the arrangement of the selected technical pre-validated module package in the virtual representation of the vehicle cabin.

19. The non-transitory computer-readable medium of claim 18, wherein the user input comprises instructions for an alteration of an individual module of the selected technical pre-validated module package selected from the group consisting of: shifting, removal, addition, replacement, modification, and combinations thereof.

* * * * *